Figure 1:
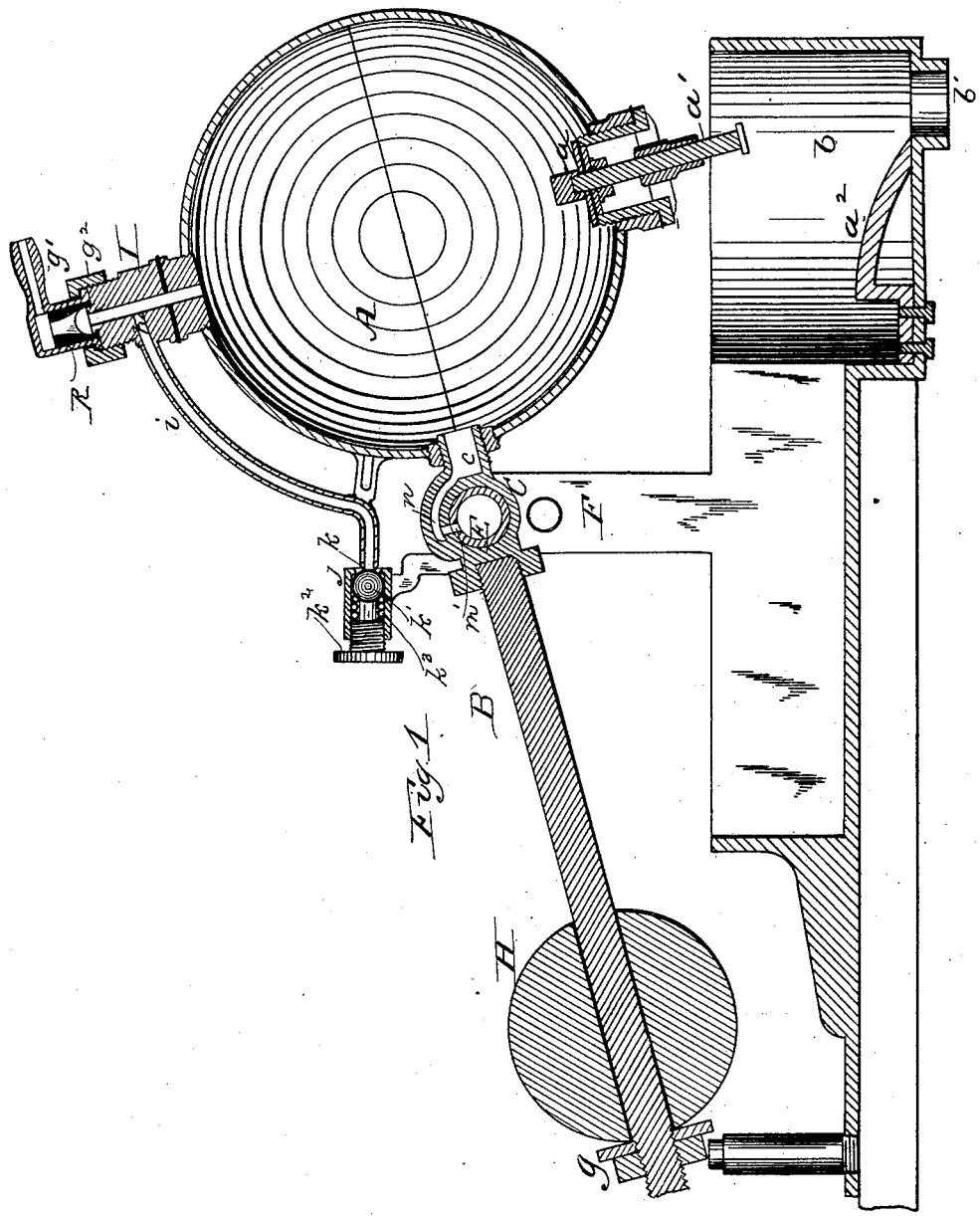

(No Model.) 2 Sheets—Sheet 1.

E. SWARTZ.
AIR COMPRESSOR.

No. 342,310. Patented May 18, 1886.

WITNESSES:
Alva A. Moore
A. C. Rawlings

INVENTOR
Eli Swartz
BY Connolly Bros
ATTORNEYS (No Model.) 2 Sheets—Sheet 2.
E. SWARTZ.
AIR COMPRESSOR.

No. 342,310. Patented May 18, 1886.

WITNESSES:
Alva A. Moore
A. B. Rawlings

INVENTOR
Eli Swartz
BY Connolly Bros
ATTORNEYS

UNITED STATES PATENT OFFICE.

ELI SWARTZ, OF PITTSBURG, PENNSYLVANIA.

AIR-COMPRESSOR.

SPECIFICATION forming part of Letters Patent No. 342,310, dated May 18, 1886.

Application filed February 20, 1886. Serial No. 192,731. (No model.)

*To all whom it may concern:*

Be it known that I, ELI SWARTZ, a citizen of the United States, residing at Pittsburg, in the county of Allegheny and State of Pennsylvania, have invented certain new and useful Improvements in Air-Compressors; and I do hereby declare the following to be a full, clear, and exact description of the invention, reference being had to the accompanying drawings, which form part of this specification.

This invention has relation to air-compressors, and particularly to that class of air-compressing apparatus employed for forcing air into casks containing beer, ale, and other liquors for the purpose of venting the same and facilitating the discharge thereof.

The apparatus embodying my invention consists, essentially, of a globular or other shaped vessel adapted to contain the charge of air, and alternately therewith a supply of water for forcing out the air, said vessel being attached to a rocking lever or rod, which is tilted when the vessel is filled with water, thereby opening a valve through which the water escapes and a valve through which air is admitted to supply the place of the water.

My invention has for its object the provision of means whereby the operation of the apparatus will be rendered thoroughly automatic and more certain and effective than the apparatus of the same class hitherto employed.

My invention accordingly consists in the combination, with the air-compressing vessel, of means whereby, when said vessel becomes filled with water, it will automatically tilt, and while tilted discharge its liquid contents and admit a supply of air.

My invention also consists in the provision of novel means whereby the supply of air to the air-compressing vessel is properly controlled, and when said vessel is fully charged with air the latter will be discharged therefrom into the cask or vessel to be vented.

My invention also consists in the combination, with the air compressing vessel mounted upon a rocking lever or rod, of a sliding or automatically-moving counterbalance-weight so arranged that when the air-compressing vessel fills with water and overbalances said weight the latter will shift its position on the rocking lever or rod and allow the vessel to remain in its lowered position until its contents are discharged.

My invention finally consists in the novel construction and combination of details, as hereinafter described and claimed.

Figure 2:
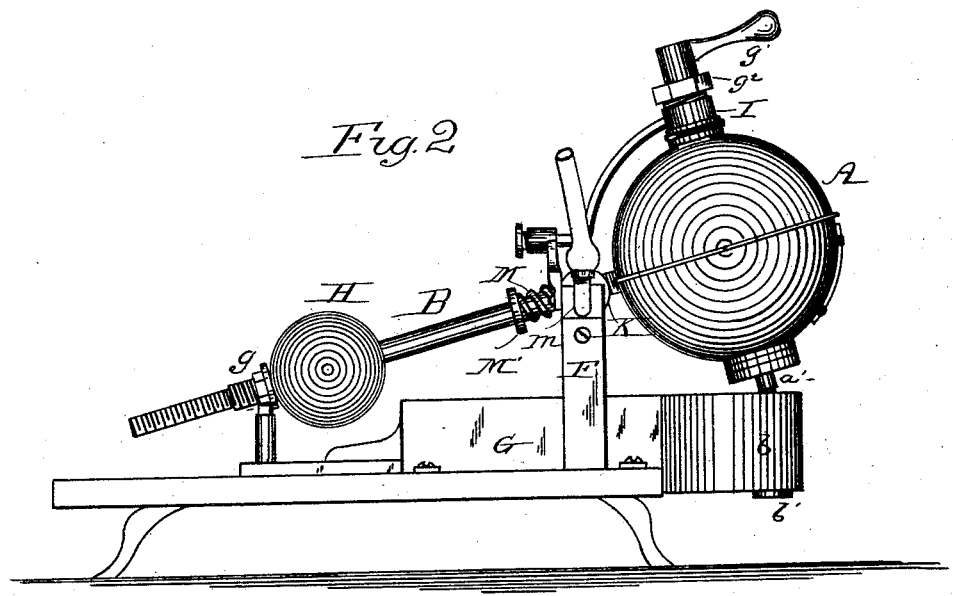
Figure 3:
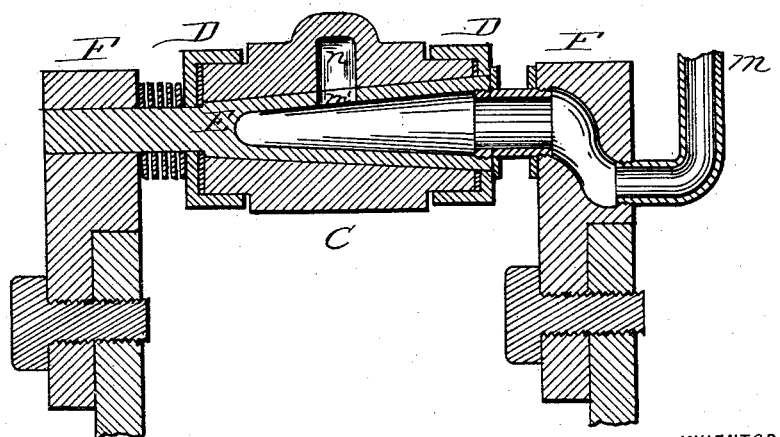

In the accompanying drawings, illustrating an air-compressor embodying my invention, Figure 1 is a central vertical longitudinal section of the apparatus. Fig. 2 is a side elevation of the same; and Fig. 3 is a sectional view of the automatic water-inlet valve.

A designates the air-vessel, consisting of a globe or sphere of copper or other material mounted upon a lever or rod, B, which is attached at one end to the body of the water-inlet valve casing C, the latter being provided with trunnions D D or collars, through which passes a hollow shaft, E, having its bearings in the upper part of standards F, rising from a suitable base, G, and constituting the pivotal point or device upon which the compressing apparatus rocks or tilts. The lever or rod B is elongated, and carries a sliding weight or weighted ball, H, having a hole through its center, through which the rod or lever passes loosely, so that the weight or ball may move freely thereon toward either end. A nut or stop, *g*, is fitted to the outer extremity of the lever or rod B, to limit the movement of the weight toward the lever end. When the rod lies inclined in one direction, the weight slides or falls toward the globe A, and when said rod is inclined in the opposite direction the weight falls or slides toward the outer end of the rod.

Heretofore, in air-compressors of this class, the counterbalance-weight has been stationary with reference to the rocking lever or rod; hence, when the compressing-vessel became filled with a small quantity of water, the position of the weight caused the latter to be overbalanced and the vessel to fall and discharge its contents, thus greatly interfering with the efficiency of the apparatus, which depends upon the vessel filling before discharging, in order that the air may be entirely discharged therefrom. By the use of the sliding weight I am enabled to entirely fill the compressing-vessel with water, and thereby completely exhaust the air, as while the vessel is filling with water the weight remains at the extremity of the rod, and only slides or falls after the weight of the water overbalances the weight. Then as the weight changes its position with reference to the fulcrum of the rod the vessel will remain in its lowered position until the entire contents of the vessel escapes. The weight is then sufficient to overbalance the emptied compressing-vessel, which it does, lifting the latter, and itself sliding or falling to its first position at the extremity of the rod.

The vessel A is provided at its base with a check-valve, $a$, properly seated and furnished with a stem, $a'$, which, when the vessel A falls, strikes against a beveled block, $a^2$, and lifts the valve from its seat, allowing the water to escape therefrom into the tank $b$, from which it is led off through the outlet $b'$.

At the upper part of the vessel A is located the outlet-nozzle I, for the escape of the air from the vessel. This nozzle or tube is provided with a nipple, $g'$, for the attachment of a flexible rubber tube, which leads therefrom to the cask to be vented. The nipple is held in place by an internally-threaded flanged collar, $g^2$, by which it is attached to the tube I. The tube I has a lateral port, $h$, from which leads a narrow tube, $i$, curving forward and downward in front of the vessel A, and terminating in a contracted or tapered point, $k$, which projects radially and terminates near a socket or valve-seat, $j$, containing a rubber ball, $k'$, held in place by an adjusting-screw, $k^2$, and spring $k^3$. When the vessel A is raised, the end of the tube $i$ comes in contact with the valve $k'$, which closes the end of the former and prevents the ingress of air while the vessel is filling with water, the object in filling the vessel with water being to compress and force out the air already contained therein. When this escape of air is taking place, it is discharged through the tube I, and enters the cask with which the vessel is connected. When, however, the air-vessel falls, the tube $i$ is opened and the air enters said vessel through the tube, filling the former as the water escapes, and leaving a charge of air to be afterward discharged into the cask as the air-vessel again fills with water.

The water-inlet is through the hollow shaft E, which constitutes a valve, and to the end of which is connected a water-supply tube, $m$. This shaft or valve is formed with a lateral aperture, $m'$, communicating, when the air-vessel is raised, with a channel, $n$, in the valve-casing C, from which a port, $c$, leads into the vessel A, as shown. The shaft or valve E is stationary, and hence only has open communication with the channel $n$ when the vessel A is raised. When the vessel A is lowered, this communication is shut off and the entrance of water precluded until the vessel A is completely emptied.

M designates a spring, encircling the rod B near the valve-casing E, and M' a ring washer or cushion, which, with said spring, constitutes a cushion to temper the fall of the weight and prevent it from striking violently against the casing.

In the cavity of the nipple $g'$ is fitted a rubber valve, R, of peculiar construction, the object of which is to prevent the escape of the air from the cask into the air-vessel when the latter is filling with water. Said valve consists simply of a small section of rubber tubing, having its upper end contracted to form a narrow slit, which opens out or expands under the pressure of air from the air-vessel, but which closes tightly against the back-pressure from the cask. Any other form of check-valve may be employed for the same purpose.

The rod or lever B is threaded for some distance from its outer end, as shown, so that the nut $g$ may be adjusted and the movement or position of the weight may be regulated to suit the requirements of the air-vessel, in order that the latter may be tilted when filled or only partially filled.

Having described my invention, what I claim, and desire to secure by Letters Patent, is—

1. In an air-compressor, the combination, with the air-compressing vessel A and the lever or rod B, upon which the same is mounted, of the counterbalance-weight H, supported and arranged to slide upon said lever, and located on the opposite sides of the fulcrum of said lever from the air-vessel, whereby, when the latter discharges its water, it will be raised by the falling of the weight, the latter sliding toward the end of the lever, substantially as described.

2. In an air-compressor, the combination, with the rod or lever B, mounted on trunnions, and having a hollow shaft forming an automatic water supply and cut-off, of the air-vessel A and the counterbalance-weight H, located upon said rod or lever on opposite sides of its fulcrum, the said weight being arranged and adapted to slide upon the lever, so as to automatically shift its position according to the inclination of the lever, substantially as described.

3. In an air-compressor, the combination, with the air-vessel A, mounted upon the rod or lever B, and having the nipple I, of the air-inlet tube $i$, secured to and moving with said air-vessel, and an adjustable and elastic stopple, $k'$, mounted in a casing, $f$, fixed upon a stationary support, whereby, when the air-vessel is raised, the air-inlet tube $i$ will be closed by said stopple, substantially as described.

In testimony that I claim the foregoing I have hereunto set my hand this 17th day of February, 1886.

ELI  his X  SWARTZ.
mark.

Witnesses:
A. A. MOORE,
JOHN F. ATCHESON.